(12) United States Patent
Lansford

(10) Patent No.: US 6,343,071 B1
(45) Date of Patent: Jan. 29, 2002

(54) WIRELESS DESKTOP AREA NETWORK SYSTEM

(75) Inventor: James L Lansford, Colorado Springs, CO (US)

(73) Assignee: Simtek Corporation, Colorado Springs, CO (US)

( * ) Notice: Subject to any disclaimer, the term of this patent is extended or adjusted under 35 U.S.C. 154(b) by 0 days.

(21) Appl. No.: 08/875,697

(22) PCT Filed: Jan. 11, 1995

(86) PCT No.: PCT/US95/00494

§ 371 Date: Jul. 10, 1997

§ 102(e) Date: Jul. 10, 1997

(87) PCT Pub. No.: WO96/21978

PCT Pub. Date: Jul. 18, 1996

(51) Int. Cl.[7] .................. H04Q 7/24; H04L 12/413; H04L 12/43
(52) U.S. Cl. .................. 370/338; 370/448; 370/461
(58) Field of Search .................. 370/338, 445, 370/447, 448, 461, 462

(56) References Cited

U.S. PATENT DOCUMENTS

| | | | |
|---|---|---|---|
| 4,602,364 A | * | 7/1986 | Herman et al. .............. 370/462 |
| 4,628,311 A | * | 12/1986 | Milling ....................... 370/447 |
| 4,667,191 A | | 5/1987 | Comroe et al. |
| 5,099,345 A | | 3/1992 | Lee et al. |
| 5,164,942 A | * | 11/1992 | Kemerman et al. ......... 370/338 |
| 5,231,634 A | | 7/1993 | Giles et al. |
| 5,325,046 A | | 6/1994 | Young et al. |
| 5,329,531 A | | 7/1994 | Diepstraten et al. |
| 5,337,213 A | | 8/1994 | Agur |
| 5,343,319 A | | 8/1994 | Moore |
| 5,351,241 A | * | 9/1994 | Yehonatan ................... 370/447 |
| 5,699,515 A | * | 12/1997 | Berkema et al. ............ 370/447 |

OTHER PUBLICATIONS

A. Santamaria and F. J. Lopez–Hernandez, "Wireless LAN Systems", published by Artech House, Inc. in U.S. in 1994 (ISBN 0–89006–609–4), pp. 19 & 20.

* cited by examiner

Primary Examiner—Chau Nguyen
Assistant Examiner—Phuongchau Ba Nguyen
(74) Attorney, Agent, or Firm—Gerald E. Lester

(57) ABSTRACT

A wireless communication system for receiving and transmitting serial bus data packets in conformance with a CSMA/CA protocol implemented in an ACCESS.bus serial bus data protocol which may accommodate either RF or IR transmissions for peer-to-peer communications between computers and between peripherals, as well as computer-to-peripheral and peripheral-to-computer communications.

13 Claims, 5 Drawing Sheets

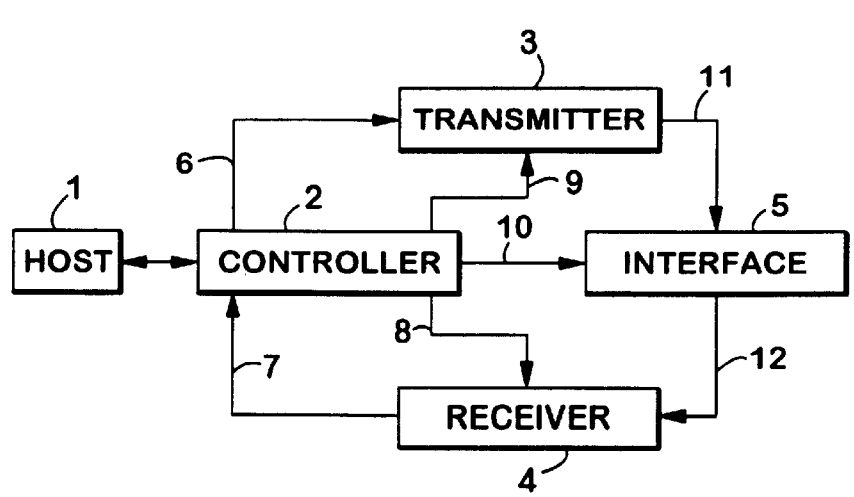
Fig. 1
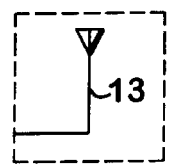
Fig. 2A
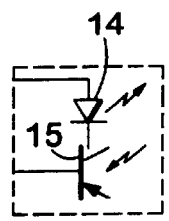
Fig. 2B
Fig. 3
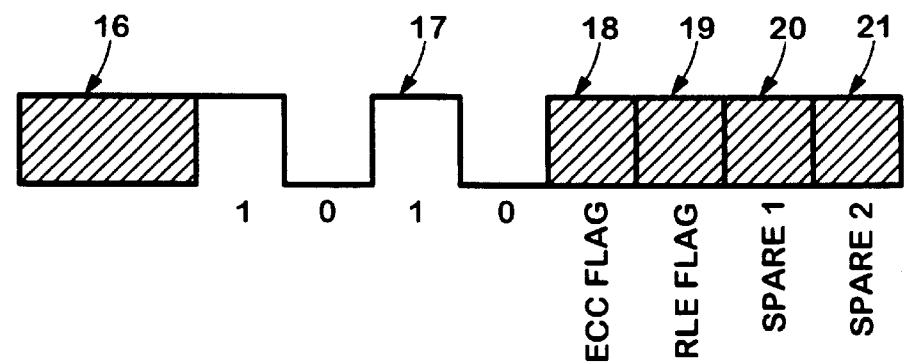
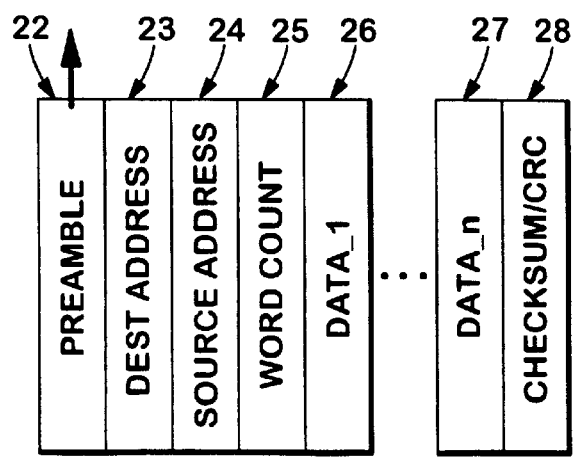
Fig. 4

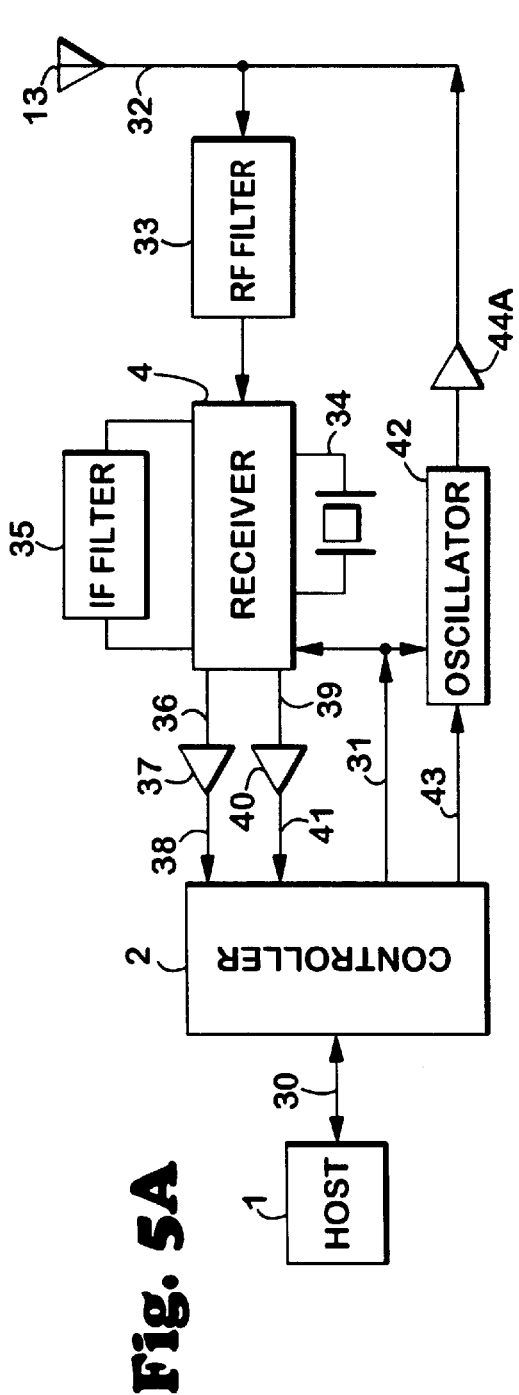
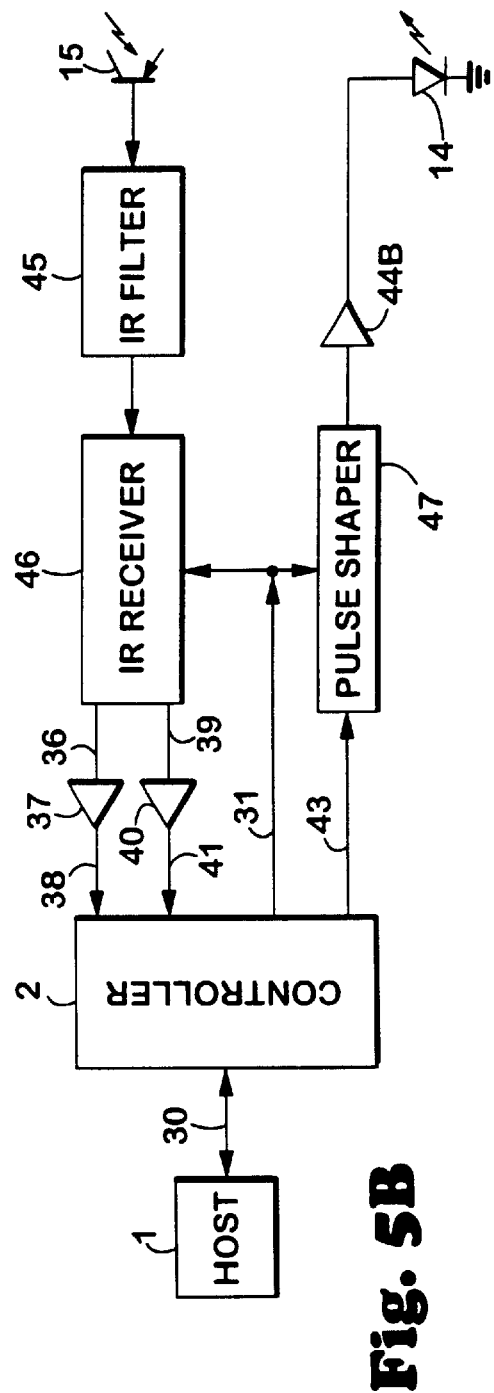

WIRELESS DESKTOP AREA NETWORK SYSTEM

FIELD OF THE INVENTION

The invention relates to a wireless communication network system for exchanging data packets between computers, and between computers and peripheral equipments such as printers, digitizing tablets, keyboards, and pointing devices or mice, within a small local area such as an office or closely arranged group of offices.

BACKGROUND OF THE INVENTION

Wireless communication networks may vary from one using a point-to-point type system where one node speaks only to one other node as in a peer-to-peer or host-to-host system, or a point and shoot type system that operates much like a television remote control in communicating with other nodes, to a true multinode system continually requiring multiple communication paths. U.S. Pat. Nos. 4,232,299; 4,775,928; 4,992,787; 5,075,792; 5,204,768; and 5,307,297 are representative.

All wireless communication networks can be conveniently classified in accordance with the area they cover. A network that covers an area having a cross-distance of miles is generally referred to as a metropolitan area network (MAN) or wide area network (WAN). A wireless network that covers cross-distances of the order of hundreds of feet generally is referred to as a local area network (LAN). Each of the above networks employ complex and costly communication protocols, which in turn require expensive hardware for implementation in accommodating information exchanges between multiple nodes. These prior implementations are impractical for use with a small area network covering, by way of example, an office where wireless communication with a computer or peripheral equipment may be desired. U.S. Pat. Nos. 4,665,519 and 5,241,542 are representative.

In a wireless network, access contention is a major concern. In general, a multiple access method can be described as either circuit switched or packet switched. Circuit switched networks are those where a connection must be continuously maintained, as with a telephone. As a result, the number of users is strictly limited. A packet switched network allocates capacity to users as a slice of time, but the connection between users only lasts for the duration of the packet. During the transmission of the packet, however, the entire capacity of the channel is available to the transmitting node. This transient connection of a packet switched network is ideal for situations where a relatively large number of nodes need to make infrequent connections to each other to communicate by rapid bursts of information.

A number of access control schemes have been developed including time division multiple access (TDMA), frequency division multiple access (FDMA), code division multiple access (CDMA), and carrier sense multiple access (CSMA). A description of the CSMA scheme may be found in "Wireless LAN Systems", by A. Santamaria and F. J. Lopez-Hernandez, pages 210–212, Artech House, 1994.

The TDMA, FDMA and CDMA control schemes have been successfully used with networks where continuous data streams are issued by a small number of nodes. Where data packets are issued rapidly from a large number of nodes, however, the CSMA control scheme has been favored. In wireless systems where relatively short bursts of data or data packets are transmitted at high speeds, the CSMA control scheme is ideal. U.S. Pat. Nos. 4,665,519 and 5,241,542 are representative.

When a network is comprised of a large number of nodes, there must in addition be a means for preventing two or more users from attempting to use a network channel simultaneously. In a wired system, a Collision Detection system usually is used in which a node compares a signal traveling over a wire with a signal that it is attempting to send. No signal is transmitted by the node as long as the compared signals differ, or until no signals are detected in the transmission channel. In a wireless system, where a network node has both a transmitter and a receiver means, and the receiver means stays energized until such time as a transmission of information is required, the occurrence of activity in a transmission channel can be detected. As with the wired communications system, the transmission can be delayed until no activity in the transmission channel is detected. The potential still exists for two or more network nodes to begin a data packet transmission at approximately the same time. A receiver in such an event will likely receive a corrupted packet and not acknowledge a successful transmission. For this reason, Collision Avoidance is used, wherein a transmitter waits or pauses before retransmitting if no acknowledgement is received within a specified time period after a first transmission. The transmission wait time is referred to as the backoff period. In known complex network protocols, the backoff period is chosen randomly according to a statistical rule.

The combination of CSMA and Collision Avoidance is referred to as CSMA/CA multiple access control. Wireless systems have been made that include CSMA/CA capabilities implemented with a MAN, WAN or LAN protocol. Such complex and expensive systems are not practical for a small area network such as a Desktop Area Network (DAN), where communication is desired with a computer or peripheral device, between computers, or between a computer and a peripheral device located in an office or in adjacent offices. While U.S. Pat. No. 4,665,519 may be said to be representative, it is a low performance, narrow band system which requires a complex and costly conversion of an RS-232C serial interface into an HDLC multipoint protocol through use of manually set DIP switches. Further, the patent discloses the use of random backoffs and manually switched frequencies, and thus is not a true CSMA system.

SUMMARY OF THE INVENTION

The invention is a wireless, high performance, broadband Desktop Area Network (DAN) system, which includes CSMA\CA multiple access control with Collision Avoidance that is implemented by utilizing a serial bus data packet protocol to accommodate wireless communication among multiple nodes. Synchronized data packet exchanges are accommodated with the between computers, between computers and peripheral equipments, and with peripheral equipments including but not limited to keyboards, printers, facsimilie machines, digitizing tablets, and pointers or mice.

In one aspect of the invention, a timing recovery method is used which is based upon a data packet structure that includes a preamble with an alternating data stream from which timing information may be extracted to synchronize the processing of the data packet.

In another aspect of the invention, CSMA multiple access control is implemented by utilizing a serial bus data packet protocol to accommodate wireless exchanges of data packet information not only between a computer and peripheral equipment, but also between computers (peer to peer).

In still another aspect of the invention, interference between nodes in transmitting messages is controlled through use of both a delay method which causes a transmitting node to wait until a communication channel is idle before transmitting data packet information, and a Collision Avoidance method in which all transmitting nodes upon failing to receive an acknowledgement signal from a target receiving node will wait for a period of time (proportional to the transmitting node's network address) before attempting to retransmit the message.

In a further aspect of the invention, the CSMA\CA multiple access control and timing recovery methods are not hardware dependent on the type of interface used to transmit and receive data packets.

In a still further aspect of the invention, only the controller need by reconfigured for host to host portability of a node subsystem comprising a controller, a transmitter, a receiver and an interface for receiving and sending modulated information data packets.

In yet another aspect of the invention, both RF and IR transmissions may be accommodated by same data and control protocols.

In an additional aspect of the invention, network configuration occurs through an automated, interactive process wherein network node addresses for each network node having a wireless network module are stored in host memory for access in selecting those of the network nodes which will form a network configuration in which wireless messages may be exchanged.

BRIEF DESCRIPTION OF THE DRAWINGS

FIG. 1 is a functional block diagram of a network node in accordance with the invention which may alternatively be used in RF or IR modes;

FIGS. 2A and 2B are alternative functional block diagrams of of Interface 5 of FIG. 1;

FIG. 3 is a diagram of a preamble structure in a data packet;

FIG. 4 is a diagram of a data packet structure;

FIG. 5A is a detailed functional block diagram of a preferred RF embodiment of the invention;

FIG. 5B is a detailed functional block diagram of a preferred IR embodiment of the invention;

DESCRIPTION OF PREFERRED EMBODIMENTS

Figure 6A:
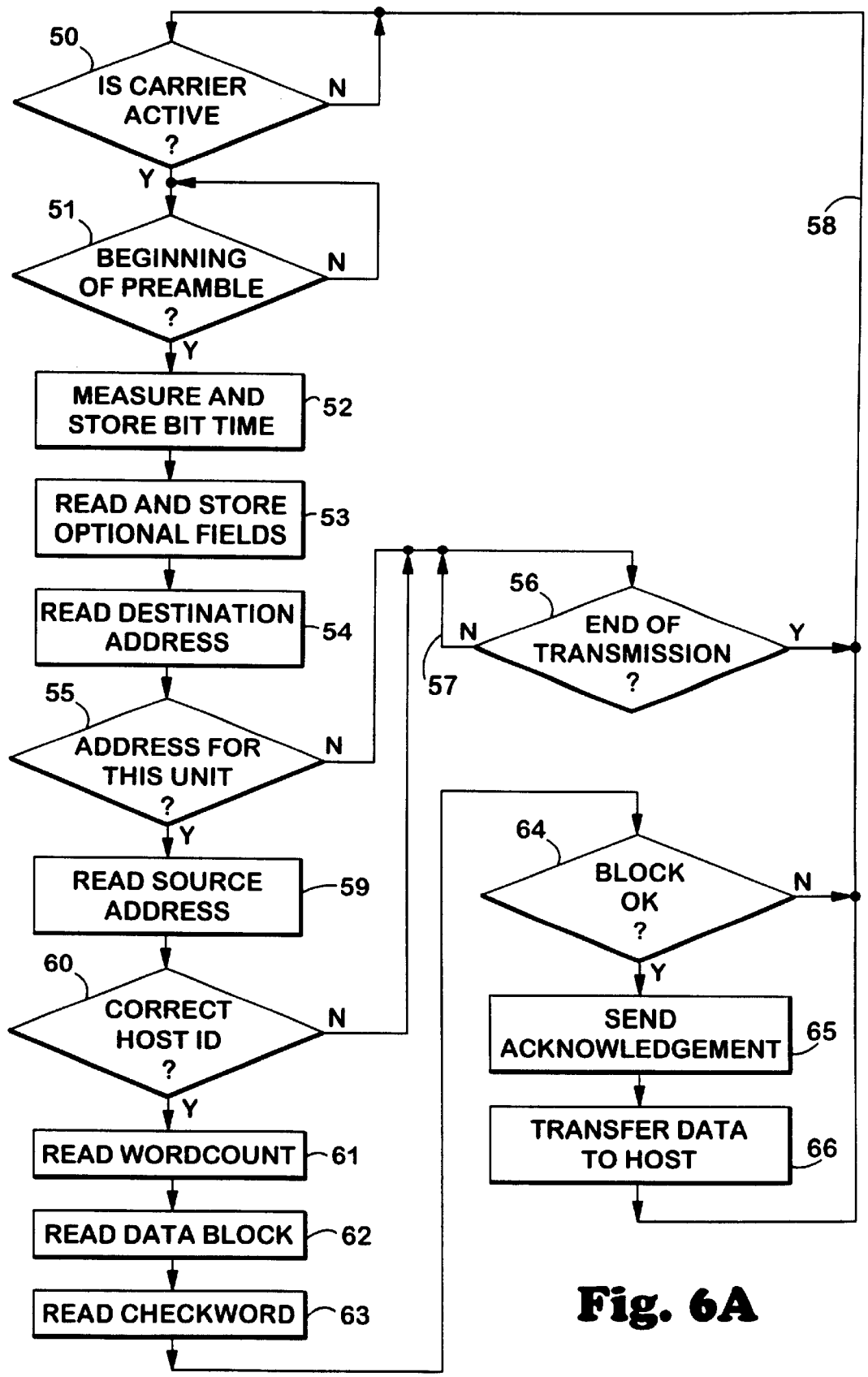
FIG. 6A is a logic flow diagram of a receiver media access control (MAC) process of controller 2 of FIG. 1.

Referring to FIG. 1, a node of a Desktop Area Network (DAN) is illustrated in which a host system 1 such as a personal computer (PC) or peripheral equipment is in electrical communication with a microcontroller 2 of a wireless network module. The microcontroller outputs data received from the host system in accordance with a data packet protocol to line 6 leading to an input of a transmitter 3, and outputs to the host system 1 demodulated data received on line 7 from the receiver 4. The controller 2 also issues an energize signal on line 9 to the transmitter 3 in response to a transmit request received from the host system 1, and issues and energize signal on line 8 to the receiver 4 to turn the receiver on when the system is not in a transmit mode. The controller 2 in addition issues a control signal on line 10 to place the interface 5 in either a transmit or receive mode.

Controller 2, transmitter 3, receiver 4 and interface 5 comprise a wireless network module which is easily portable from host to host.

Communication between the controller 2 and the host 1 may occur by way of a variety of port interfaces including but not limited to a parallel port, an RS-232 serial port, a PCMCIA port, and an ACCESS.bus port.

FIGS. 2A and 2B respectively illustrate an RF antenna 13 which is shared by the receiver 4 and transmitter 3 when the interface 5 is an RF embodiment; and an IR light emitting diode (LED) 14 that is connected to the output of transmitter 3 and an IR sensitive transistor 15 which is connected to the input of receiver 4 when the interface 5 is an IR embodiment.

The antenna 13 preferably is a whip or loop (OdB) antenna accommodating a received power level of –20 dBm at three meters, and during a transmit mode exhibiting a hemispherical or torodial pattern.

In the RF embodiment of the invention, a data stream from host 1 is received by transmitter 3 from controller 2 as data packets, and is encoded onto a carrier by frequency shift keying with continuous phase modulation. The modulated carrier then is sent by transmitter 3 to antenna 13 in interface 5, where the modulated carrier is broadcast to a receiving target node. The receiver of the target node then demodulates the carrier to recover the data packets and read the transmitted message or data.

FIG. 3 is a graphical illustration of a preamble structure of a data packet that is communicated between computers, between a computer and peripheral equipment, or to a computer or peripheral equipment in a DAN network in accordance with the invention. The preamble includes an indeterminate field 16 followed by an alternating data stream of binary ones and zeros 17, an error correction coding (ECC) field 18, a run-length limited error (RLE) field 19, and spare fields 20 and 21 to accommodate optional information.

The structure of an entire data packet in accordance with the invention is illustrated in FIG. 4, where a preamble structure 22 is followed by a destination address field 23, a source address field 24, a word count field 25, n data fields 26–27, and a checksum/cyclic redundancy check field 28 to allow data validation by a receiving node.

The above described data packet structure is in conformance with a wired serial bus protocol referred to as the ACCESS.bus protocol. A description of the ACCESS.bus may be purchased from the ACCESS.bus Industry Group as "ACCESS.bus Specifications-Version 2.2", ACCESS.bus Industry Group, 370 Altair Way, Suite 215, Sunnyvale, Calif. 94086.

The preferred embodiment described herein uses carrier sense multiple access (CSMA) control to accommodate short bursts of data at high speeds among multiple nodes. In addition, a delay method is used which causes a transmitter in a network node to pause or wait when activity in the transmission channel is detected. Further, a Collision Avoidance (CA) method has been implemented which comes into play when a transmission to a target node is made, but no acknowledgement signal is received from the target node within a specific time period. The CA method causes the transmitting node to wait a period of time proportional to the network address of the transmitting node before retransmitting an information signal. The combined CSMA and CA functionalities comprise a CSMA/CA access control system.

Referring to FIG. 5A, where devices have same reference numbers as like devices previously described, a detailed functional block diagram of an RF preferred embodiment of a DAN network node is illustrated. Communication between the host system 1 and controller 2 occurs over a port interface 30. When the node system is in the receive mode as indicated by an inactive status on the transmission/receive line 31, modulated radio signals are received by the antenna 13 and are carried over bidirectional RF line 32 to RF bandpass filter 33. The output of filter 33 is applied to the input of receiver 4, where the radio signals are demodulated. The receiver may be an integrated circuit sold by Philips Semiconductor Inc. of 811 East Arques Avenue in Sunnyvale, Calif. 94088 as IC circuit Model No. SA626. The receiver 4 is a superheterodyne frequency modulation (FM) receiver using a local oscillator frequency of 16.42 megahertz provided by the crystal oscillator 34. Final intermediate frequency filtering is performed by bandpass filter 35. If a signal is detected by the receiver 4, the voltage level on the Received Signal Strength Indicator (RSSI) line 36 increases and is compared by comparator 37 to a threshold of the order of −40 dBm or 10 dB above noise, whichever is greater. If the threshold is exceeded, the comparator generates a binary detection signal on line 38. In response to the detection signal, controller 2 executes signal processes which will be further described below.

The receiver 4 also detects any frequency deviations in the received signal, and issues a voltage with magnitude indicative of the deviation on line 39. The voltage is compared by the comparator 40 with a threshold value equal to approximately one-half of the comparator supply voltage. In the preferred embodiment, the supply voltage is of the order of 3.3 volts. The output of the comparator is a data stream that is applied to an input of controller 2, where the data stream is converted to a desired data format and sent to the host system 1 by way of the port interface 30.

In transmit mode, the host system 1 sends data to the controller 2 over the port interface 30. In response, an interrupt is generated in the controller 2 which causes it to execute a series of transmit process steps. During the transmit process, a signal is applied by the controller 2 to the line 31 to turn the receiver 4 off, and enable the transmitter oscillator 42 which transmits at a center frequency of 27.12 megahertz. As data to be transmitted is sent by controller 2 along line 43 to the transmitter oscillator 42, the signal levels on line 43 cause frequency shifts in the oscillator 42 in a continuous phase transition. The output of the oscillator, a frequency shifting carrier with continuous phase modulation at a frequency deviation of 100 KHz, is buffered by a common base amplifier 44A, and coupled to the bidirectional RF line 32 for broadcast by antenna 13.

An IR DAN network node is illustrated in block diagram form in FIG. 5B, where like devices have a same reference number as those illustrated in FIG. 5A. In FIG. 5B, modulated IR signals are received by an IR sensitive transistor 15. The base of the transistor 15 is connected to the input of an IR filter 45. The output of filter 45 in turn is connected to the input of an IR receiver 46. The operation and design specifications of the receiver are disclosed in the document entitled, "HPSIR-Wired Serial and Infrared I/O, Architecture External Reference Specification, Version 1.1", dated Apr. 11, 1991. The document is made available by the Hewlett-Packard Optical Communication Division at 350 West Trimble Road, San Jose, Calif. 95131.

One input of the receiver 46 is connected to line 31 and to an input of pulse shaper 47. The input of pulse shaper 47 is connected to line 43 and the output of the pulse shaper is connected to the input of a common emitter buffer amplifier 44B. The output of the amplifier 44B in turn is connected to the input of the IR LED diode 14. When the node system is in the received mode as indicated by an inactive status on the transmission/receive line 31, modulated IR signals received by transistor 15 are applied through IR bandpass filter 45 to IR receiver 46, where demodulation occurs. If an IR signal is detected by receiver 46, the voltage level on line 36 increases and is compared to a threshold by comparator 37 as before described. The comparator 37 generates a binary detection signal on line 38 if the threshold is exceeded. In response to the detection signal, controller 2 executes signal processes which will be further described below.

The receiver 46 also detects any amplitude deviations in the received signal, and issues a voltage with magnitude indicative of the deviation on line 39 where the voltage is compared by the comparator 40 with the before described threshold value. The output of the comparator is a data stream that is applied to an input of controller 2, where the data stream is converted to a desired data format and sent to the host system 1 by way of the port interface 30.

In transmit mode, the host system 1 sends data to the controller 2 over the port interface 30. In response, an interrupt is generated in the controller 2 which causes it to execute a series of transmit process steps. During the transmit process, a signal is applied by the controller 2 to the line 31 to turn the receiver 46 off and enable the p pulse shaper 47. Data to be transmitted is sent by controller 2 along line 43 to the pulse shaper 47, which converts the data stream to a Hewlett-Packard serial format that is disclosed in the Hewlett-Packard document identified above. The output of the pulse shaper, an amplitude shift keying modulated carrier, is buffered by the amplifier 44B and applied to the IR LED 14, which radiates for 3/16 of a bit time period to indicate a logic 0. A logic one is indicated when the LED is turned off for an entire bit time period.

The transmit and receive functions performed by a DAN network system node are executed in accordance with a media access control (MAC) logic decision process residing in controller 2, which defines the structure of the data packets and assures the integrity of the information within the packets. Referring to FIG. 6A, a logic decision flow diagram of a MAC receive function is illustrated. When a data packet transmitted by a source node is detected by the controller of a receiving node at logic step 50, the controller searches for the beginning of a preamble at logic step 51. The initial four bits of the preamble are used to determine the timing of the incoming data fields of the data packet at logic step 52, and if used, the trailing fields of the preamble are sensed and stored for further processing at logic step 53. The destination address field 23, as illustrated in FIG. 4, then is read at logic step 54 and compared at logic step 55 with the address of the receiving node. If the address that is read is not the same as the receiving node address, the logic process proceeds to logic step 56 to circulate around an inner loop 57 until the controller senses an end of the transmission. Upon the end of transmission being sensed, the logic decision process proceeds to the outer loop 58 to await a new transmission.

If the destination address read at logic step 54 is the same as the address of the receiving node, however, then the logic decision process proceeds from logic step 55 to logic step 59 where the source address 24 of FIG. 4 of the received data packet is read. The source address is compared at logic step 60 with an internal list of allowed source addresses. If no coincidence of addresses occurs, the logic decision process transfers to logic step 56 to await the end of the current transmission as before described. If a coincidence occurs, however, the source address is on the internal list of allowed sources and the controller reads the word count in the field 25 of FIG. 4 at logic step 61 to determine the number of data bytes that will be received. The indicated number of data bytes in the data packet then is read at logic step 62. After reading the final data byte, the controller at logic step 63 reads the last word in the data packet, the checksum/CRC field 28 of FIG. 4, and thereafter determines at logic step 64 whether the data packet was received without error. If so, the logic decision process proceeds to logic step 65 to deenergize receiver 4, and to energize transmitter 3 of FIG. 1 to send an acknowledgement signal by way of the antenna of interface 5 to the source node. The logic decision flow then proceeds to logic step 66, where the data bytes read from the received data packet are transferred by the controller 2 over port 30 to the host computer 1 of FIG. 1 for further processing. Thereafter, the logic decision flow returns to the outer loop 58 to await the receipt of another transmission.

If the checksum/CRC field 28 of FIG. 4 indicates at logic step 64 of FIG. 6A that the data packet was not received error free, the controller does not acknowledge receipt of the data packet. Rather, the logic decision flow proceeds from logic step 64 to the outer loop 58 to await the receipt of another transmission as before described. It is left to the source node to determine whether and when to retransmit a data packet.

Figure 6B:
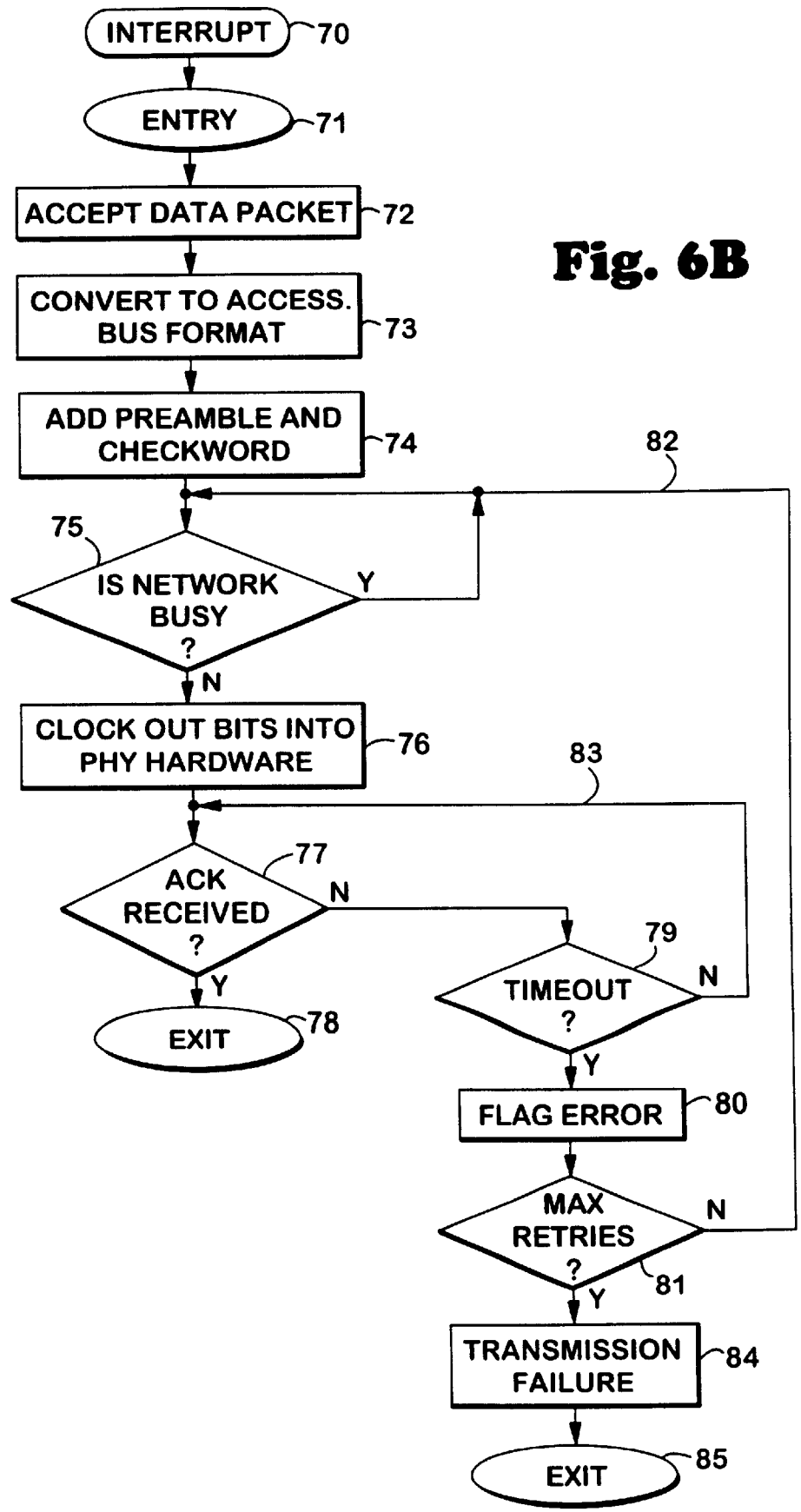
FIG. 6B is a logic flow diagram of a transmitter MAC process of controller 2.

The transmission of a data packet is an interrupt driven event. When the controller 2 receives a transmit request from the host computer 1 as illustrated by logic step 70 of FIG. 6B, a transmit service process is initialized at logic step 71. The controller thereafter accepts a data packet from the host computer at logic step 72. The data packet then is converted by the controller at logic step 73 to the format previously described and illustrated in FIG. 4. At logic step 74, a preamble with timing information is inserted at the beginning of the data packet, and a checkword is appended to the end of the packet to allow the receiving node to verify receipt of an error free data packet.

The data packet thereupon is ready for wireless transmission by interface 5 of FIG. 1, and the logic decision flow proceeds to logic step 75 to wait until there is no activity in the network before beginning transmission. When no network activity is detected, the logic decision flow proceeds to logic step 76 where the controller 2 of FIG. 1 issues the data packet bit stream to the transmitter 3 for transmission by way of the RF antenna in interface 5. The logic decision flow then determines at logic step 77 of FIG. 6B whether an acknowledgement from the destination or receiving node has been received. If so, the transmit process is exited at logic step 78. If not, the logic decision flow awaits the receipt of the acknowledgement by looping through logic step 79, until either an acknowledgement is received at logic step 77 or timeout occurs at logic step 79. The controller will wait for only a brief period (two seconds or less) before declaring a timeout fault at step 79. If an acknowledgement is received before timeout, the logic decision flow proceeds from logic step 77 to logic step 78 as before described. If a timeout occurs before an acknowledgement is received, however, the logic decision flow proceeds from logic step 79 to logic step 80 where a timeout error is recognized. The logic decision flow then proceeds to logic step 81 where the number of timeouts that have occurred is compared to a threshold value. If the threshold value has not been exceeded, the logic decision flow waits for a period of time proportional to the numerical network address of the node, and then transfers from logic step 81 to logic step 75 by way of loop 82 to retransmit the data packet as before described.

If an acknowledgement is not received at logic step 77 and a timeout is not detected when the logic decision flow moves to logic step 79, the logic decision flow will return to logic step 77 by way of loop 83. Further, when the number of timeouts that have occurred without receiving an acknowledgement exceeds the previously described threshold value, the logic decision flow will pass through logic step 81 to logic step 84 rather than return by way of loop 82 to the logic step 75. At logic step 84, the controller 2 sends the host computer 1 of FIG. 1 a transmission failure flag, and thereafter exits the transmit service process at logic step 85.

The MAC logic decision process described above remains the same whether the RF system of FIG. 5A or the IR system of FIG. 5B is used.

Figure 7:
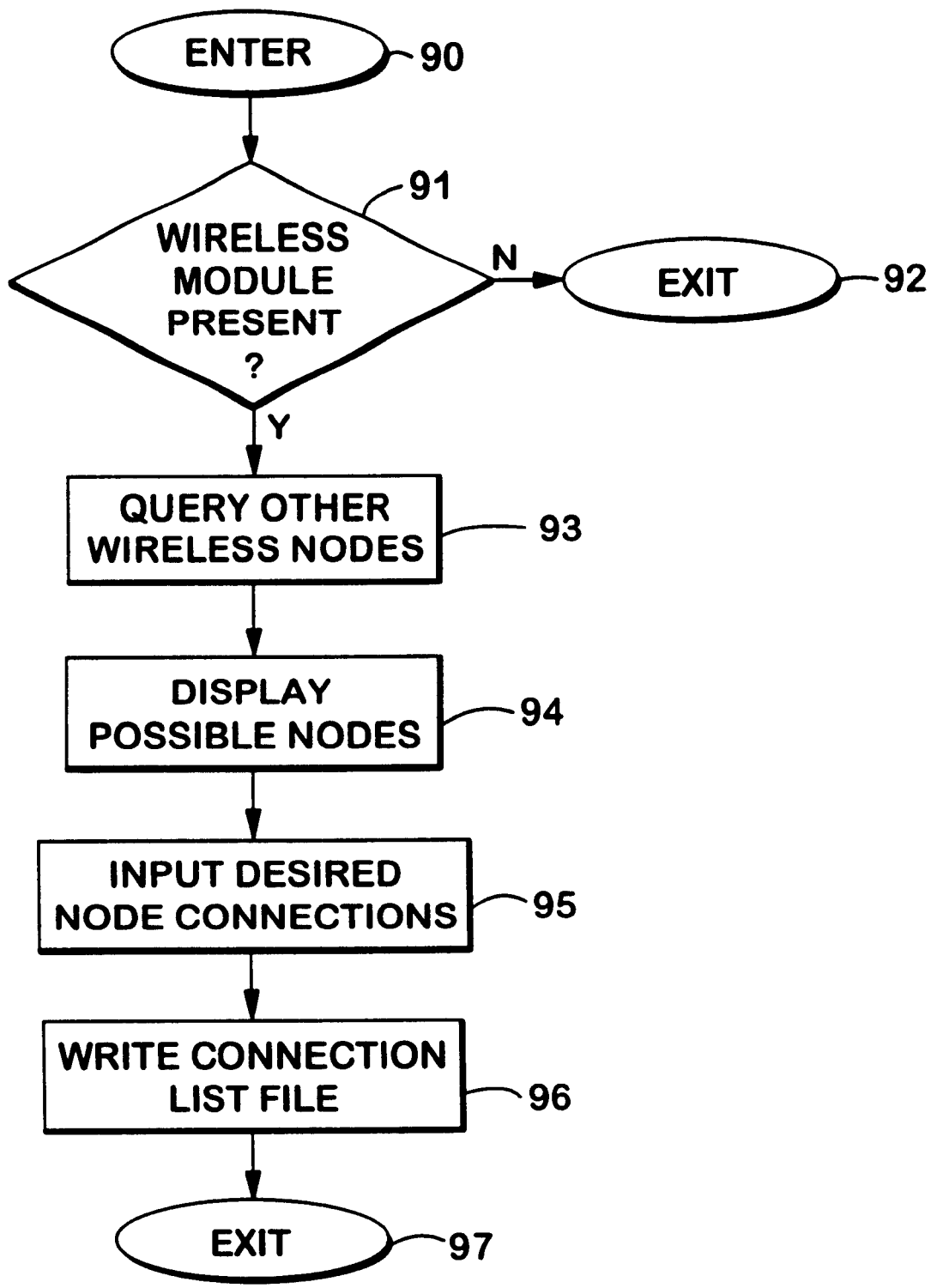
FIG. 7 is a logic flow diagram of a wireless network configuration process of host 1.

FIG. 7 illustrates a logic decision flow diagram of an interactive network configuration process in host 1. Upon initializing the process at logic step 90, host 1 queries the port interface 30 at logic step 91 to determine whether a wireless network module as illustrated in FIG. 1 is present. If not, host 1 displays a message that indicates no wireless network module is present, and the process is exited at logic step 92. If, however, a wireless network module is present, the host may request a capabilities string or list of module capabilities at logic step 93. Upon receipt of the capabilities string, the host 1 displays at logic step 94 a list a valid network nodes in the DAN network. The user thereupon selects those nodes which are to be included in the network configuration at logic step 95, and the host 1 writes a file of node addresses and connections for storage in a host memory at logic step 96. Thereafter, the file is read by host 1 each time the host is booted, and the information in the file is inserted into the address fields of the data packets to be transmitted. The process then is exited at logic step 97.

Preferred embodiments of the invention have been described and illustrated. It should be apparent to those skilled in the art that the invention can be modified in arrangement and detail without departing from the spirit and scope of the following claims.

What is claimed is:

1. A method of transmitting and receiving serial bus data packets between computers, between computers and peripherals, and between peripherals in a broadband, wireless DAN network having multiple nodes, which comprises the steps of:

formatting said data packets by a transmitting node to conform with a CSMA/CA multiple access control protocol;

inserting data timing information in preambles of said data packets by said transmitting node for synchronizing the transfer of said data packets to a receiving node of said multiple nodes;

adding error check information at the end of said data packets by said transmitting node to allow data validation by said receiving node;

modulating said data packets by said transmitting node for transmission to said receiving node;

transmitting said data packets to said receiving node if said transmitting node detects no transmission signals in a transmission channel of said wireless DAN network, and delaying transmission of said data packets until said transmission channel is idle if said transmitting node detects transmission signals in said transmission channel;

upon receipt of said data packets by said receiving node, demodulating said data packets and sampling said data timing information by said receiving node to synchronize a reading of data;

detecting said error check information at said receiving node to determine whether an error free transmission of said data packets has occurred, and issuing an acknowledgment signal by said receiving node to said transmitting node in the event of said error free transmission; and retransmitting said data packets by said transmitting node after a delay in time proportional to a network address of said transmitting node if said acknowledgment signal is not received by said transmitting node within a wait time period.

2. The method set forth in claim 1 wherein said CSMA/CA multiple access control protocol is implemented in an ACCESS.bus data packet protocol.

3. The method set forth in claim 1, wherein said wireless DAN network system is an RF system.

4. The method set forth in claim 1, wherein said wireless DAN network system is an IR system.

5. The method set forth in claim 1, further including the following network configuration steps of said transmitting node:

detecting the presence of a wireless network module in said transmitting node;

upon detection of said wireless network module, identifying a set of said multiple nodes including said transmitting node which have wireless network modules;

selecting from said set a group of said multiple nodes to form a desired network configuration; and inserting a network address of said receiving node of said group in said data packets prior to a transmission to said receiving node.

6. A network node system in a broadband, wireless DAN network of multiple nodes for receiving and transmitting information between computers, between computers and peripherals, and between peripherals in serial bus data packets, which comprises:

interface means for alternatively irradiating and receiving modulated information signals formatted in conformance with a CSMA/CA and wired serial bus data packet protocol;

transmitter means in electrical communication with said interface means for modulating first information signals and thereafter supplying first modulated information signals to said interface means to initiate a transmission to a receiving node of said multiple nodes;

receiver means in electrical communication with said interface means for receiving second modulated information signals of a transmitting one of said multiple nodes, for demodulating said second modulated information signals, for sampling an alternating data stream in preambles of demodulated second information signals to synchronize data transfers, and for receiving an acknowledgment signal from said receiving node;

control means in electrical communication with said transmitter means, said receiver means and said interface means for placing said network node system in either a transmit or a receive mode, for inserting an alternating data stream into preambles of said first information signals during a transmission mode, for detecting transmission signals in a transmission channel of said wireless DAN network, for transmitting said first modulated information signals if said transmission channel is idle, for delaying transmission of said first modulated information signals until said transmission channel is idle in the event said transmission signals are detected, and for initiating a retransmission of said first modulated information signals after a first time delay numerically proportional to a network address of said network node system if an acknowledgment signal is not received from said receiving node within a second time delay; and a host system in electrical communication with said control means and including means for supplying said first information signals to said transmitting means and requesting a transmission of said first information signals to said receiving node, and for receiving said second information signals from said receiver means for further processing.

7. The network node system set forth in claim 6, wherein said CSMA/CA multiple access protocol is implemented in an ACCESS-bus data packet protocol.

8. The network node system set forth in claim 6, wherein said network node system is an RF system.

9. The network node system set forth in claim 6, wherein said network node system is an IR system.

10. The network node system set forth in claim 9, wherein said transmitter means applies amplitude shift keying modulation to encode said first information signals.

11. The network node system set forth in claim 8, wherein said transmitter means applies continuous phase modulation to a frequency shifting carrier to encode said first information signals.

12. The network node system set forth in claim 6, wherein a subsystem comprised of said interface means, said transmitter means, said receiver means and said control means is portable from host system to host system in said wireless DAN network.

13. The network node system set forth in claim 6, wherein said host system further includes means for detecting the presence of a wireless network module in said network node system, interactive user means for selecting a set of said multiple nodes having wireless network modules to form a desired network configuration, and memory means for storing network addresses and interconnections of said set for automated access in transmitting said first modulated information signals to said receiving node in said desired network configuration.

* * * * *